March 24, 1931. T. F. JOHNSON, JR 1,797,346
METHOD AND APPARATUS FOR LOCATING DEFECTIVE INSULATORS
Filed June 8, 1923
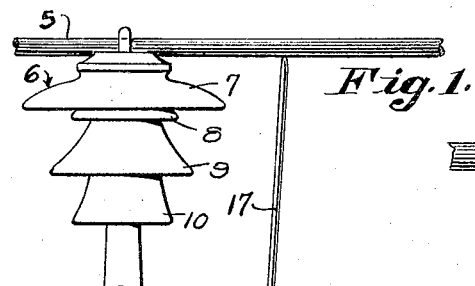
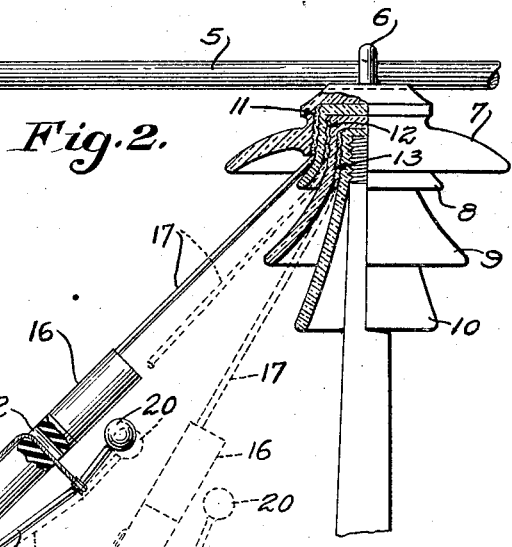
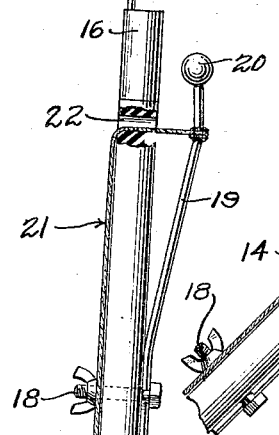
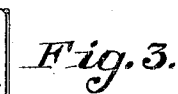
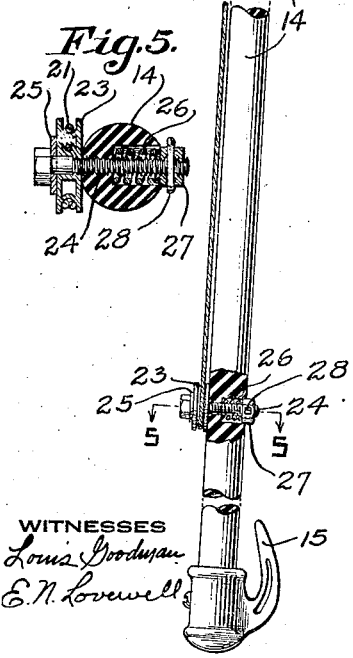
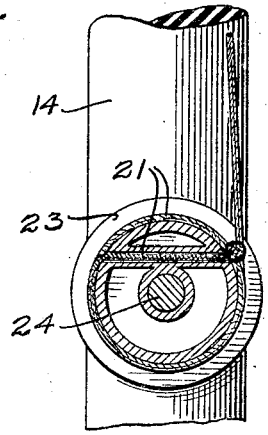
T. F. Johnson, Jr.,
INVENTOR
WITNESSES
BY
ATTORNEY Patented Mar. 24, 1931

1,797,346

UNITED STATES PATENT OFFICE

TOMLINSON FORT JOHNSON, JR., OF ATLANTA, GEORGIA

METHOD AND APPARATUS FOR LOCATING DEFECTIVE INSULATORS

Application filed June 8, 1923. Serial No. 644,150.

This invention relates to a method and apparatus for locating defective insulators, and is adapted to be used in connection with any and all types of insulators while in position and under operating voltage.

The present invention is in the nature of an improvement over the methods disclosed in my Patent No. 1,366,078 issued January 18, 1921, and my re-issued Patent No. 15,025 dated January 11, 1921. In the methods described in the above mentioned patents for locating the defective insulators without shutting off the current from the line, the operator first tested each unit by a process of feeling-out to determine the approximate condition of the insulator, and to ascertain whether the defects in the same were of such nature as to permit the second step of localizing the defective units, or whether the defects were so great as to make the second step unwise. The second step, when carried out, consisted of short-circuiting the ends of each individual unit. When the preliminary step showed that possibly only one good unit was left in the string, it was inadvisable to carry out the second step on account of the possible injury to the operator or to the line.

The object of the present invention is to provide a method and apparatus by means of which a thorough testing may be carried out on any type of insulator under service conditions.

A further object of the invention is to provide a device by means of which such testing may be carried on by a continuous process without any preliminary testing, and may be done by one operator.

The preferred steps of the method and a novel instrument by which it is carried out will be best understood from the following detailed description taken in connection with the accompanying drawing, which illustrates the invention as used in connection with a multiple part pin-type insulator.

In the drawing:

Figure 1 is a side elevation, with parts broken away and shown in section, of the apparatus used, and illustrates one step of the method.

Figure 2 illustrates in full lines a second step, and in dotted lines two subsequent steps.

Figure 3 is a side elevation of the upper portion of the apparatus taken at the right of Figure 1.

Figure 4 is a detail view of the sheave which forms a part of the apparatus.

Figure 5 is a detail sectional view on the line 5—5 of Figure 1.

Referring in detail to the drawing, 5 is a high-tension wire which is supported by an insulator 6, which in the present case is of the pin-type, consisting of the nested porcelains 7, 8, 9 and 10 separated by layers of cement 11, 12 and 13, respectively. The apparatus includes a stick 14, usually about eight feet in length, and composed of wood, or other suitable non-conducting material and usually provided with a hook 15 at its lower end for the purpose of hooking the instrument in a lineman's belt while he is climbing up and down the line supporting structure, or to hang the instrument somewhere on the structure, so that he can have both hands free while climbing to a new position. This stick 14 has a metallic cuff or ferrule 16 at its upper end, to which is secured a projecting metallic prong 17. Some distance below the ferrule 16, say, about a foot, a bolt 18, or other suitable securing means, having a thumb nut is attached to the stick 14 and supports a spring rod 19 having a metallic ball 20 at its upper end opposite the ferrule 16, said rod 19 being so tensioned that the ball 20 will normally be held at some distance from the ferrule 16.

A non-conducting cord 21 has its upper end secured to the rod 19 near the ball 20, and passes thence through a transverse bore 22 formed diametrically in the stick 14, and the lower end of the cord is secured to a sheave 23 revolubly mounted on a bolt 24, or the like, near the lower end of the stick 14. The sheave 23 is frictionally held against free rotation on the bolt 24 by any suitable means. As herein shown the washer 25 underneath the bolt head frictionally engages the side of the sheave and is held in close engagement by a coiled compression spring 26 acting against the nut 27, which is held by a cotter pin 28. The sheave 23 may be rotated against this frictional resistance to draw the ball 20 toward the ferrule 16, or to release the same and permit it to recede from the ferrule by reason of the tension in the rod 19. The frictional resistance to the movement of the sheave will hold the rod 19 without slipping in any position from its maximum distance from the cuff 16 to the position where the ball is in contact with the cuff. By this arrangement the distance from the ball to the cuff may be varied at will.

In carrying out my improved method, the prong 17 is preferably first placed in contact with the wire 5, as shown in Figure 1, and the cord 21 is wound on the sheave 23, drawing the ball 20 toward the ferrule 16 until the peak of a spark jumps continuously between the ferrule and the ball. All insulators have electrical capacity, and act more or less as electrical condensers and when dealing with high voltage lines, it is not necessary to complete a circuit in order to get a spark. The capacity between the ferrule 16 and the hook 15 is greater than the capacity between the bolt 18 where the rod 19 is attached and the hook 15. The spark, which jumps across the gap between the ferrule and the ball, is the result of this difference in capacity. Now, if the prong 17 is placed in contact with the cement 11, the spark between the ferrule 16 and the ball 20 will cease if the porcelain 7 is not defective. By winding the sheave 23 to draw the ball 20 closer to the ferrule, it will reach a point where the peak of a spark will begin again. Similarly the prong 17 may be placed in contact with the cement 12 and the cement 13, and the spark gap successively reduced until the spark jumps again. As the number of insulator parts between the prong 17 and the line 5 is increased, the spark gap will successively diminish if the various insulator parts are not defective. If at any time the spark continues to jump without diminishing the spark gap from that found for the previous point, this shows a totally defective part. If the necessary change is abnormally small, it indicates a partially defective member.

By means of the method, as above described, it will be understood that the difference in potential of the various insulator parts may be accurately gaged, and it may therefore be accurately determined whether the action is normal or defective. The method may be carried out by a single operator, and with great rapidity, since it is only necessary to touch each part once.

In the foregoing description I have described the method in connection with one specific type of insulator, but it will be readily appreciated that the same method and the same apparatus may just as easily and as efficiently be used in connection with any other type. It will also be understood that although I have shown and described the specific structure of one form of apparatus adapted to be used in carrying out the method, various modifications may be made therein without sacrificing any of its important features or the principles embodied therein.

What is claimed is:

1. The method of locating defective insulators on live transmission lines by means of an instrument having an adjustable spark gap, which consists in applying the instrument to a single point on the line and the different insulator units successively, and adjusting the gap in each position of the instrument until a succession of sparks is obtained to determine the relative potentials of the different points.

2. The method of locating defective insulators on live transmission lines by means of an instrument having an adjustable spark gap, which consists in electrically connecting the instrument at one side of the gap to points on the line and the different insulator parts, and adjusting the gap so as to obtain a succession of sparks at each position of the instrument to determine the relative potentials of the different points with which the instrument is electrically connected, and thereby determine the condition of the insulator between those points.

3. The method of locating defective insulators on live transmission lines by means of an instrument having an adjustable spark gap, which consists in electrically connecting the instrument at one side of the gap to the line, and adjusting the gap until sparks are obtained, and then connecting the instrument in the same manner to the successive insulator parts beginning with the one nearest the line and adjusting the gap successively, whereby to compare the potentials at the different points tested.

4. An apparatus for testing insulators on live transmission lines, comprising a pole of non-conducting material, a single metallic prong carried at the upper end of the pole and adapted to form an electric contact with the line or a point on the insulator, a spring member carried by the pole and normally separated from the prong, and means secured to the spring member and adjustable from the lower end of the pole to move the spring member toward the prong and retain it in that position, the pole having electrical capacity between the spring member and the prong.

5. An apparatus for testing insulators on live transmission lines, comprising a pole of non-conducting material, a metallic cuff secured to the upper end of the pole and having an upwardly projecting prong adapted to form an electric contact with the line or a point on the insulator, a spring member carried on the pole below the cuff and having a terminal ball, said spring member being tensioned so as to normally hold the ball at some distance from the cuff, and means secured to the spring member and adjustable from the lower end of the pole to move the spring member toward the cuff.

6. An apparatus for testing insulators on live transmission lines, comprising a pole of non-conducting material, a single metallic prong projecting therefrom, a resilient member also projecting from the pole below the prong, a ball on the end of said member, and means connected to said member for adjusting the same toward or from the prong, to measure the relative intensities of the potentials at the different points to which the metallic prong is applied.

7. An apparatus for testing insulators on live transmission lines, comprising a support of non-conducting material, a single prong carried thereby adapted to form an electric contact with the line or a point on the insulator, a resilient member connected to the support and insulated from the prong, and means for manually moving said member toward or from the prong while the latter is held in contact with said line or point.

8. The method of testing insulators on live transmission lines which consists in successively drawing electric sparks from the separate connections between the units of the insulators and mechanically measuring or gaging the relative intensities of the successive sparks to determine the insulating quality of the several insulator parts.

9. The method of testing an insulator unit on a live transmission line which consists in withdrawing an electric spark from one side of the unit; gaging its intensity; then withdrawing a spark from the other side of the unit; also gaging its intensity; and comparing the relative gaged intensity of the sparks to determine the quality of the insulator.

10. The method of testing an insulator unit on a transmission line which consists in separately gaging the potential characteristics on the side adjacent to the line and the side remote from the line and thereby obtaining comparative measurements to determine the quality of the insulator.

11. The method of testing insulators on live transmission lines, which is characterized by the application of an instrument having electrical capacity to different points on an insulator assembly; producing manifestations of the differences in potentials between each point of application and the ground; and obtaining positive comparative measurements of the separate manifestations whereby to determine the insulating characteristics of the several insulator parts.

12. A device for testing insulators on live transmission lines comprising, in combination, a pole of non-conducting material, a single metal prong connected to one end of the pole adapted to be placed in electrical contact with the line or a point on an insulator; a metal spring arm secured at one end to the pole and insulated from the prong so that the pole has electrical capacity between the prong and the spring arm; a ball on the free end of said spring arm normally spaced from the secured end of the prong to provide a spark gap; and a flexible, non-conducting pull element connected to the spring arm to adjust the spark gap.

In testimony that I claim the foregoing as my own, I have hereto affixed my signature.

TOMLINSON FORT JOHNSON, Jr.